US006872960B2

(12) United States Patent
Pepper et al.

(10) Patent No.: US 6,872,960 B2
(45) Date of Patent: Mar. 29, 2005

(54) ROBUST INFRARED COUNTERMEASURE SYSTEM AND METHOD

(75) Inventors: David M. Pepper, Malibu, CA (US); Dennis C. Jones, Malibu, CA (US)

(73) Assignee: Raytheon Company, Waltham, MA (US)

( * ) Notice: Subject to any disclaimer, the term of this patent is extended or adjusted under 35 U.S.C. 154(b) by 332 days.

(21) Appl. No.: 09/837,733

(22) Filed: Apr. 18, 2001

(65) Prior Publication Data

US 2002/0153497 A1 Oct. 24, 2002

(51) Int. Cl.$^7$ .......................... G01B 11/26; G01S 13/86
(52) U.S. Cl. ................. 250/495.1; 250/201.9; 250/216; 250/203.1; 250/203.2; 250/203.6; 250/492.1; 342/14; 342/16; 342/20
(58) Field of Search ............................ 250/495.1, 492.1, 250/201.9, 203.1, 203.2, 203.6, 216; 398/93–96, 118–120, 128–131, 150–172; 359/237–240, 338–340, 246–259, 276–289, 334, 337, 341, 174, 111, 109, 115, 152

(56) References Cited

U.S. PATENT DOCUMENTS

| | | | | |
|---|---|---|---|---|
| 3,731,892 A | * | 5/1973 | Cantella et al. | ............ 244/3.16 |
| 4,005,935 A | | 2/1977 | Wang | |
| 4,309,602 A | * | 1/1982 | Gonsalves et al. | ....... 250/201.9 |

(Continued)

FOREIGN PATENT DOCUMENTS

EP          0819367 B1 *   9/2001   ........... H05B/37/02

OTHER PUBLICATIONS

Aerotech News and Review, Nov. 21, 2001, "BAE Systems Tactical IR Countermeasure passes major milestone", http://www.aerotechnews.com/starc/2001/112101/BAE_systems.html.*

Arimoto et al., "Configuration of the adaptive optics fiber coupler", Fig. 4. in SPIE OE Reports—Sep. 1997, http://www.spie.org/app/Publications/magazines/oerarchive/september/sep97/SpaceLaser.html.*

Arimoto et al., "Design of Adaptive Optics for 1.5 micron laser communication", http://www2.crl.go.jp/mt/b162/ao_sys1–e.html.*

(Continued)

*Primary Examiner*—John R. Lee
*Assistant Examiner*—Bernard E. Souw
(74) *Attorney, Agent, or Firm*—Daly, Crowley, Mofford & Durkee, LLP (57) ABSTRACT

A system and method for focusing electromagnetic energy on a moving target. Generally, the inventive system sends a pilot beam to a target and analyzes a return wavefront to ascertain data with respect to any distortions and other phase and/or amplitude information in the wavefront. This information is then used to pre-distort an output beam by so that it is focused on the target by the intervening distortions. In an illustrative embodiment, the pilot beam is provided by a beacon laser mounted off-axis with respect to the output beam. The reflected wavefront is received through a gimbaled telescope. Energy received by the telescope is detected and processed to ascertain wavefront aberrations therein. This data is used to predistort a deformable mirror to create an output beam which is the phase conjugate of the received wavefront. In a first alternative embodiment, a nonlinear optical phase-conjugate mirror is employed to generate the required wavefront-reversed replica of the received wavefront. The system further includes an arrangement for modulating the output beam to confuse the target. In a second alternative embodiment, the system is adapted to examine atmospheric distortions of starlight to predistort the output beam. The alternative embodiment offers a faster response time and a lower susceptibility to detection.

30 Claims, 3 Drawing Sheets

U.S. PATENT DOCUMENTS

| | | | | |
|---|---|---|---|---|
| 4,666,103 A | * | 5/1987 | Allen | 244/3.11 |
| H299 H | * | 7/1987 | Miller, Jr. | 244/3.13 |
| 4,767,195 A | | 8/1988 | Pepper | |
| 4,794,345 A | * | 12/1988 | Linford et al. | 359/338 |
| 4,794,605 A | * | 12/1988 | Aprahamian et al. | 372/9 |
| 4,825,062 A | * | 4/1989 | Rather et al. | 250/201.1 |
| RE33,287 E | * | 8/1990 | Allen | 244/3.11 |
| 4,949,056 A | * | 8/1990 | Akkapeddi | 359/334 |
| 4,996,412 A | * | 2/1991 | Anafi et al. | 250/201.9 |
| 5,034,627 A | * | 7/1991 | Ayral et al. | 359/305 |
| 5,042,922 A | * | 8/1991 | Pepper | 349/17 |
| 5,048,935 A | * | 9/1991 | Efron et al. | 349/1 |
| 5,051,571 A | * | 9/1991 | Brown et al. | 250/201.9 |
| 5,166,508 A | * | 11/1992 | Davis et al. | 250/201.9 |
| 5,378,888 A | * | 1/1995 | Stappaerts | 250/201.9 |
| 5,528,493 A | * | 6/1996 | Potter | 702/3 |
| 5,592,293 A | * | 1/1997 | Garfinkle | 356/450 |
| 5,684,545 A | * | 11/1997 | Dou et al. | 349/1 |
| 5,693,951 A | * | 12/1997 | Strong, III | 250/504 R |
| 5,936,720 A | * | 8/1999 | Neal et al. | 356/121 |
| 5,938,148 A | * | 8/1999 | Orenstein | 244/3.15 |
| 5,973,309 A | * | 10/1999 | Livingston | 250/203.1 |
| 6,130,419 A | * | 10/2000 | Neal | 250/201.9 |
| 6,219,360 B1 | * | 4/2001 | Komine | 372/9 |
| 6,396,588 B1 | * | 5/2002 | Sei | 356/512 |
| 6,404,784 B2 | * | 6/2002 | Komine | 372/9 |
| 6,409,345 B1 | * | 6/2002 | Molebny et al. | 351/212 |
| 6,535,816 B1 | * | 3/2003 | Smith | 701/213 |
| 6,674,520 B2 | * | 1/2004 | Hicks et al. | 356/139.04 |
| 6,738,012 B1 | * | 5/2004 | Kirkpatrick | 342/67 |
| 2001/0002915 A1 | * | 6/2001 | Komine | 372/9 |
| 2002/0030873 A1 | * | 3/2002 | Paoli | 359/152 |
| 2002/0153497 A1 | * | 10/2002 | Pepper et al. | 250/495.1 |
| 2002/0196506 A1 | * | 12/2002 | Graves et al. | 359/172 |
| 2003/0062464 A1 | * | 4/2003 | Byren et al. | 250/201.9 |
| 2003/0062468 A1 | * | 4/2003 | Byren et al. | 250/216 |

OTHER PUBLICATIONS

Arimoto et al., "Introduction to Optical Space Communication Group", http://www2.crl.go.jp/mt/b162/index-e.html.*

Arimoto et al., "High speed optical feeder-link system using adaptive optics", SPIE Proc. vol. 2990, Free-Space Laser Communication Technologies IX, San Jose, CA, Feb. 1997, pp. 142-151.*

Arimoto et al., "Configuration of the adaptive optics fiber coupler", Fig. 4. in SPIE OE Reports—Sep. 1997, http://www.spie.org/web/oer/september/sep97/SpaceLaser.html.*

Arimoto et al., "Introduction to Optical Space Communication Group", wysiwyg//101http://www2.crl.go.jp/mt/b162/index-e.html.*

Electro-Optical Products Corporation, EOPC—Optical Modulator, Chopper, Beam Deflector, and Shutter, http://www.eopc.com/choppers.html.*

ERA Technology, "Drivers for Optical Modulators", wysiwyg://148/http://www.era.co.uk/product/driver.htm.*

Global Security, "Tactical Aircraft Directable Infrared Countermeasures (TADIRCM)", wysiwyg://109/http://www.globalsecurity . . . ry/systems/aircraft/systems/tadircm-.htm.*

Sanders News Release, wysiwyg://118/http://www.iews.na-.baesystems.com/business/99__news/sa1804.htm.*

BAE Systems Information & News vol. ll, No. 18, Oct. 22, 2001, "TADIRCM Passes Static Firing Tests".*

Military Review, Mar.-Apr. 2001, "10 GPS Vulnerabilities", "GPS Signals Jammed During Tank Trials", http://www-cg-sc.army.mil/milrev/English/MarApr01/adams.asp.*

"Ground-Based Laser Energy Projection", wysiwyg://457/http://www.afrlhorizons.com/Briefs/Sept01/DE0108.html.*

"The Non-Cooperative Dynamic Compensation Experiment", wysigwyg://569/http://www.afrlhorizons.com/Briefs/Sept01/DE0107.html.*

United States Air Force, Fact Sheet, North Oscura Peak, Jan. 1999, http://www.de.afrl.af.mil/factsheets/oscura.html.*

United States Air Force, News Release, Jan. 26, 1999, http://www.de.afrl.af.mil/News/1999/99-06.html.*

SPIE Web, Publications, http://www.spie.org/scripts/toc.pl?volume-3381&journal=SPIE.*

Higgs et al. "Adaptive Optics Compensation Using Active Illumination", http://spie.org/scripts/abstract.pl?bib . . . 8SPIE%2e3381%2e%2e%2e47H&page=1&qs=spie.*

Gemini Adaptive Optics Program, RPT-AO-G0092, Sep. 27, 1999.*

Chu et al., "A curvature-based laser guide star adaptive optics system for Gemini-South", Gemini Preprint #60, http://www.gemini.edu/documentation/preprints/pre60.html.*

Boeing Stab Kickoff, Aug. 8, 2000.*

Bill Hillaby, "Directed Energy Weapons Development and Potential", http://www.sfu.ca/~dann/Backissues/nn4-3__12.htm.*

Joint Theater Missile Defense, http://www.wslfweb.org/docs/dstp2000/dtopdf/06-D.pdf.*

Gemini Adaptive Optics Archive, http://www.gemini.edu/sciops/instruments/adaptiveOptics/AOarchive.html.*

Daniel C. McCarthy; A Lean, Mean Photonics Machine; Photonics Spectra; May 2000 issue.

Daniel C. McCarthy "A Lean, Mean Photonics Machine", Photonics in: Military/Aerospace, Jun. 13, 2000, pp. 5-11.

* cited by examiner

ROBUST INFRARED COUNTERMEASURE SYSTEM AND METHOD

BACKGROUND OF THE INVENTION

1. Field of the Invention

The present invention relates to imaging systems and methodologies. More specifically, the present invention relates to countermeasures for infrared sensing systems.

2. Description of the Related Art

Imaging systems are used for a variety of commercial, industrial and military applications. Of particular interest for military applications are infrared sensing systems and techniques. Infrared sensing systems detect heat and are therefore effective in conditions of darkness, smoke, haze and other situations where visible detection is impractical. Accordingly, many weapons have been developed which rely on infrared sensors for target acquisition and tracking and terminal guidance. The development of weapons with infrared technology has given rise to a need for countermeasures for same.

Several techniques are used in the art for infrared countermeasures or 'IRCM'. Conventional IRCM countermeasures include sensor blinding, lethality-based approaches, and modulated lasers for "spoofing." In most of these cases, a high-energy or high-power laser is required. In the "spoofing" approach, for example, a laser beam is temporally modulated to confuse the navigational homing system in the threat vehicle. The laser beam must be spread in angle to cover a field-of-view (FOV) of sufficient breadth to illuminate a target.

Unfortunately, the efficiency of the spoofing approach, as well as other IRCM approaches, is limited by atmospheric distortions and other aberrations that tend to impede the diffraction-limited performance of the system. As a result, most of the light "spills over" the target, and represents a loss to the system. In addition, residual beam wander, due to excess vibrations, finite servo gain on trackers, etc., creates the need to increase the angular spread of the IRCM modulated laser beam, to assure adequate target illumination. Consequently, this approach requires a high-power source which adds to the size, weight, cost and power requirements of the system and limits the performance thereof.

Hence, a need exists in the art for an improved system or method for focusing infrared energy on a moving target and maintaining it on the target throughout its flight path. A further need exists for a system for focusing infrared energy on moving target with temporal encoding or modulation to effect spoofing for countermeasure protection.

SUMMARY OF THE INVENTION

The need in the art is addressed by the system for focusing electromagnetic energy of the present invention. Generally, the inventive system sends a pilot beam to a target and analyzes a return wavefront to ascertain data with respect to any distortions thereof. This information is then used to pre-distort an output beam by so that it is focused on the target by the intervening distortions.

In an illustrative embodiment, the pilot beam is provided by a beacon laser mounted off-axis (or may be mounted on-axis) with respect to the output beam. The reflected wavefront is received through a gimbaled telescope. Energy received by the telescope is detected and processed to ascertain wavefront aberrations therein. This data is used to predistort a deformable mirror to create an output beam which is the phase conjugate of the received wavefront. The system further includes an arrangement for modulating the output beam to confuse the target.

In an alternative embodiment, the system is adapted to examine atmospheric distortions of starlight to predistort the output beam. The alternative embodiment offers a faster response time and a lower susceptibility to third-party detection of the system.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The illustrative application of this invention is in connection with infrared countermeasures (IRCM) with respect to incoming threats. The present invention enables the IRCM system to function with optimal efficiency. As discussed more fully below, in accordance with the adaptive optics system of the present teachings, a high-energy laser may be used to blind a sensor or to physically damage critical components on an incoming threat, with or without imposed modulation. The present invention allows for the use of a laser which operates with potentially lower power than the lasers used in the prior art. The laser is used to confuse a navigational tracking system on the threat or to blind the sensor with a gated signal.

Figure 1:
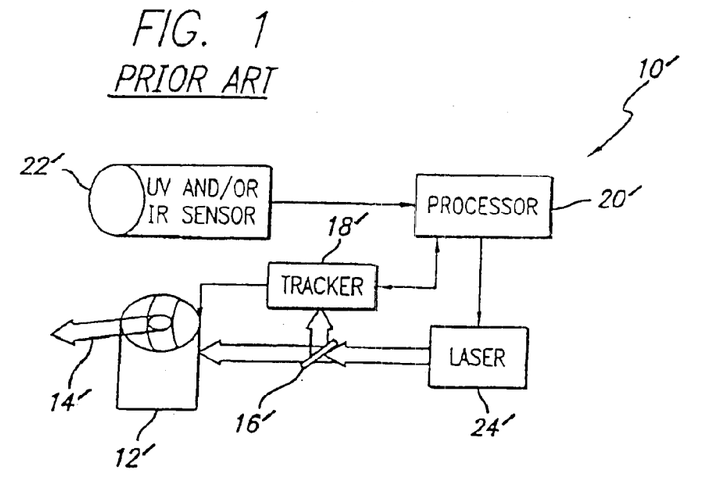
FIG. 1 is a simplified block diagram of a typical infrared counter-measure laser system implemented in accordance with conventional teachings.

FIG. 1 is a simplified block diagram of a typical infrared counter-measure laser system implemented in accordance with conventional teachings. As shown in FIG. 1, the typical conventional IRCM system 10' includes a gimbaled telescope 12' adapted to receive light 14' emanating from a target. The received beam 14' is directed to a tracker 18' by a beamsplitter 16'. The tracker 18' includes a detector (not shown) and provides control signals to the telescope 12' effective to cause the telescope 12' to track a target. The output of the tracker 18' is also input to a processor 20'. The processor 20' also receives signals from an ultraviolet (UV) or infrared (IR) missile warning sensor 22'. In response, the processor 20' outputs a signal to control the gimbaled telescope 12' as well as to control a laser 24' effective to cause the laser 24' to output a high power output beam in the direction of the target. The output of the laser 24' may be modulated by the processor to spoof the target.

As mentioned above, this conventional approach suffers from the shortcoming that atmospheric distortions and other aberrations tend to impede the diffraction-limited performance of the system. As a result, most of the light "spills over" the target, and represents a loss to the system. In addition, residual beam wander, due to excess vibrations, finite servo gain on trackers, etc., creates the need to increase the angular spread of the IRCM modulated laser beam, to assure target illumination. Consequently, this approach requires a high-power source which adds to the cost and limits the performance of the system.

Hence, a need has existed in the art for an improved system or method for focusing infrared energy on a moving target and maintaining it on the target throughout its flight path. This need is addressed by the system and method of the present invention.

Figure 2:
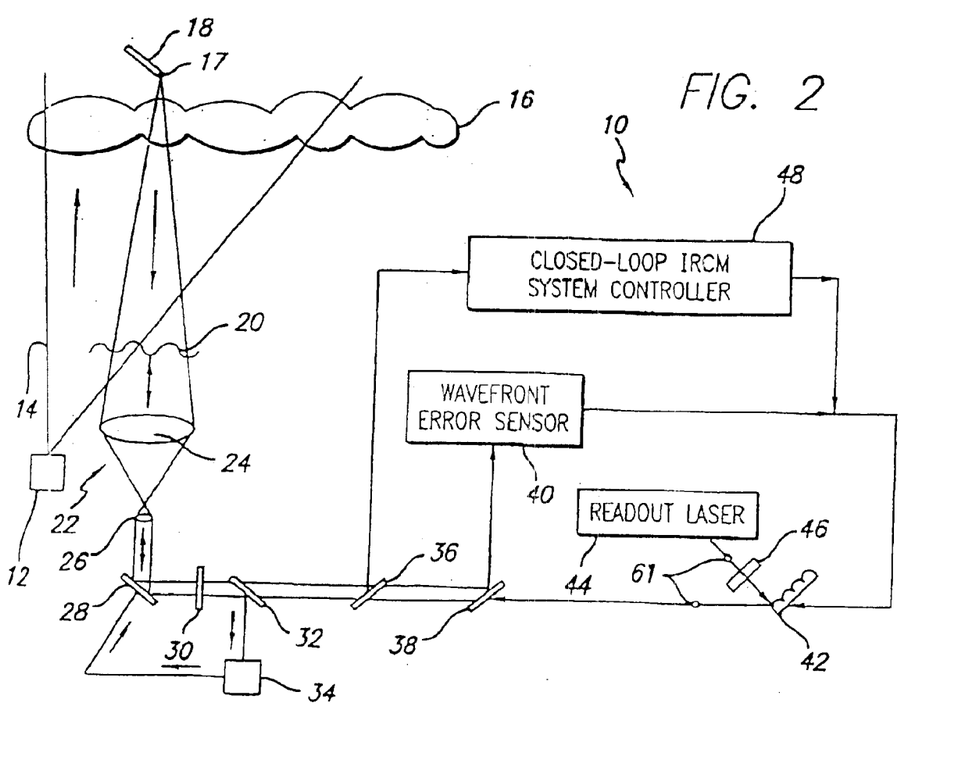
FIG. 2 is a simplified optical schematic and electrical block diagram of an infrared counter-measure system implemented in accordance with the teachings of the present invention.

FIG. 2 is a simplified optical schematic and electrical block diagram of an infrared counter-measure system implemented in accordance with the teachings of the present invention. The system 10 includes a beacon laser 12 which may be mounted off-axis or on axis with respect to a telescope 22 discussed more fully below. Those skilled in the art will appreciate that the system 10 is adapted to operate with a coarse tracker such as that shown in FIG. 1. The coarse tracker directs the system 10 toward a detected target. The system 10 subsequently performs fine tracking as discussed more fully below.

In accordance with the present teachings, the beacon laser 12 outputs a pilot beam 14 in the direction of a target 18. The pilot beam is reflected as a 'glint' by the target 18. A glint is a highly reflective (i.e., specular) feature 17 on the target 18 which typically has a lateral dimension on the order of, or less than, the diffraction limit of the optical system. The glint spreads out as a return wavefront 20 which is distorted by the atmosphere, shown generally at 16. The distorted wavefront 20 is then received by first and second lenses 24 and 26, respectively, of a telescope 22. The optical design of the telescope 22 can include mirrors and/or diffractive optical elements instead of the lenses. The telescope focuses the received wavefront 20 onto a gimbaled mirror 28. The mirror 28 directs the reflected wavefront 20 to a second mirror 32 via a laser amplifier 30. The laser amplifier is adapted to amplify energy at the wavelength of the beacon laser 12. In practice, the laser amplifier may be an optical parametric amplifier or other suitable laser amplifier known in the art depending on the operating wavelength of the beacon laser 12.

In the illustrative embodiment, the second mirror 32 is a conventional low reflectance beamsplitter. A portion of the received wavefront 20 is directed to a tracker 34. The tracker 34 may be implemented in the same manner as the tracker 18' of FIG. 1. That is, the tracker 34 includes a detector and control logic (not shown) for providing tilt control and focus correction for the mirror 28.

A second beamsplitter 36 directs a portion of the received beam to a closed-loop IRCM system controller 48. The controller 48 provides modulation control as discussed below.

Another portion of the received wavefront is directed to a wavefront error sensor 40 by a third beamsplitter 38. As discussed more fully below, the wavefront error sensor detects aberrations in the received wavefront and provides control signals for a deformable mirror 42 effective to cause the mirror to reflect energy from a readout laser 44 as a phase conjugate of the received wavefront. The mirror 42 provides a wavefront-reversed replica of the incoming beam, which retraces the path of the incident beam. The conjugator 42, in essence, provides for the "fine" angle tuning of the return beam, thereby compensating for small-angle dynamic beam wander and relative platform motion, as well as compensation of dynamic higher-order wavefront errors. The mirror 42 can be in the form of a self-pumped phase conjugate mirror (PCM), an adaptive closed-loop system (e.g., a spatial light modulator, a liquid crystal light valve (LCLV), micro-electrical-mechanical (MEMS) array, with a wavefront error sensor, a four-wave mixer, a double-pumped PCM, or a stimulated Brillouin scattering (SBS) cell.

The wavefront error sensor 40 may be implemented in accordance with techniques well known in the art including shearing interferometers, Shack-Hartmann systems etc.

The output of the readout laser 44 is modulated directly or by an electro-optic shutter 46 under control of the IRCM controller 48 mentioned above. The shutter 46 and the IRCM controller 48 may be of conventional design and construction. The IRCM controller 48 detects the modulation scheme or is fed target type data from an external tracking system or a database (not shown).

In operation, a "two-pass" approach is employed, as opposed to the "singlepass" approach in the prior IRCM art. In the present invention, the threat is first actively illuminated by the broad-angle (a large field-of-view, FOV) beacon beam 14. A fraction of the light scatters from the seeker of the missile 18 and is collected at the telescope 22. This glint return, which has been distorted by the intervening optical path (i.e., the atmosphere 16), is subsequently conjugated, amplified and, by virtue of the wavefront-reversal property of the conjugator 42, is automatically redirected back to the threat. The conjugation process thereby compensates for dynamic atmospheric distortions, and beam wander, resulting in a diffraction-limited laser beam incident back on the target. System efficiency is enhanced over the prior art, since the corrected, return beam is amplified, and automatically directed back to the target as a diffraction-limited beam with little or no "spillover"; losses incurred in the large-area beacon illuminator are minimal, since this is in the low-energy leg of the sequence of two "passes".

In one embodiment of the present invention, the conjugate beam is also temporally modulated with, as an example, amplitude information (e.g., pulse-position encoding) as to "spoof" (or, "jam") the incoming object (e.g., a missile), thereby confusing its navigational homing system. Moreover, by modulating the phase-conjugator mirror 42 directly, a compact system can be realized.

In traditional IRCM systems, the broad-angle high-power laser source (or laser amplifier) is modulated, typically, at kHz rates, to achieve the desired countermeasure. In this invention, while it is still possible to modulate the laser amplifier, it is also possible to modulate the conjugate beam instead, which is in a low-power (optical) leg of the system, and, in many cases, is easier to implement. This is effected by the modulator 46. Thus, the system has more flexibility to accommodate different modulation formats or rates, as well as different types of lasers and amplifiers, that may not easily adapt well to the required direct modulation formats. Moreover, since the readout laser can be chosen to possess a single transverse (or spatial) mode, a variety of compact, low-cost modulators can be used for the modulator 46.

In another embodiment of the present invention, no temporal encoding of the conjugate beam is required. In this case, the diffraction-limited and amplified return beam propagates back to the target with sufficient flux to blind or otherwise damage critical components.

The front-end beam steering arrangement (which may also be implemented with a MEMS deflector or an optical phased array) provides "coarse" angle tracking of the target and therefore bore-sighting of the beam into the conjugator's field-of-view (FOV).

Given the conjugation property of the system, the effective angular spread (or focus) of the return beam will dynamically adapt to the field-of-view of the target as it approaches the IRCM system, thereby optimally directing (i.e. "auto-targeting") the counter-measure beam to the target during flight.

The optional optical amplifier 30 provides greater return flux to the target. Finally, the optical detector and modulation signal processor 48 provides information as to the effectiveness of the IRCM system, as well as potential updating of the modulation format, as needed, for optimal IRCM system performance.

The invention provides for precision "auto-targeting" of the threat vehicle, as well as modulation of the laser beam onto the moving platform, which is actively illuminated by a broad-angle beacon beam. The broad-angle beam illuminates the general region where a target is assumed to exist. Since the modulation is in a low-power leg of the system, and not constrained to be in the high-power leg (such as in the broad-area illuminator, laser amplifier, etc.), the system is more flexible, in that other candidate optical amplifiers, lasers, and modulators can he employed, relative to the prior art. (In this connection, the 'low-power' leg can be the readout beam from the laser 44 along the beam path 61.) Moreover, given the relative low-power of the readout laser, low-cost, high precision, compact conjugation devices (42) can be employed, such as MEM phase-shifting arrays, with minimal thermal loading.

Figure 3:
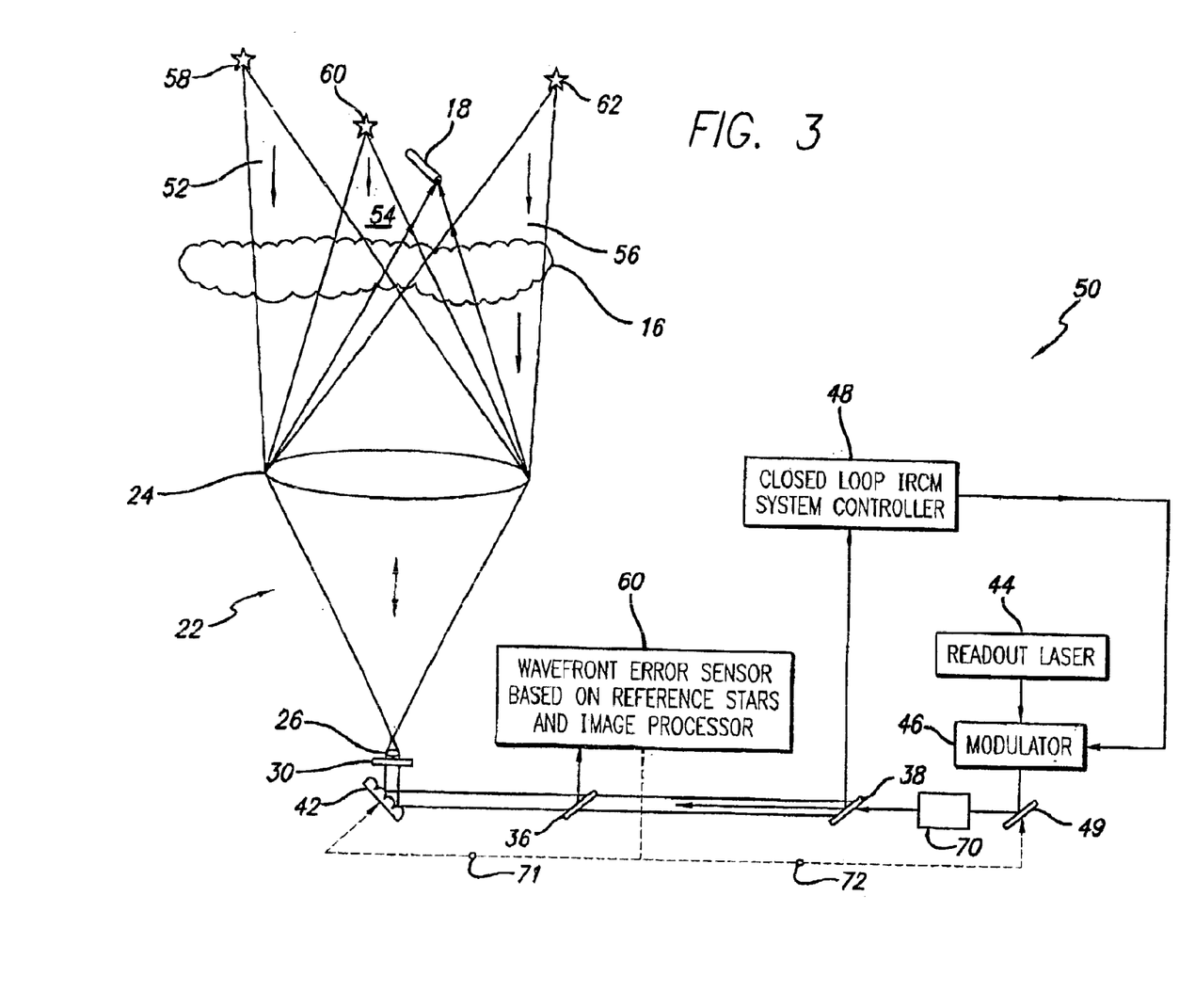
FIG. 3 is an optical schematic and electrical block diagram of an alternative embodiment of the system for focusing electromagnetic energy of the present invention.

FIG. 3 is an optical schematic and electrical block diagram of an alternative embodiment of the system for focusing electromagnetic energy of the present invention. The system 50 is adapted to use starlight to predistort an output beam thereby reducing the time required for beam optimization and the susceptibility for detection. In the embodiment of FIG. 3, light 52, 54 and 56 from first, second and third stars 58, 60 and 62, respectively, is received by the first and second lenses 24 and 26 of the telescope 22 and amplified by an optional amplifier 30 before illuminating a deformable mirror 42. In the receive mode, the mirror 42 is adapted to accurately reflect the received beam to the beamsplitters 36 and 38. The first beamsplitter 36 directs a portion of the received wavefront to a wavefront error sensor 60 adapted to receive the starlight data and detect aberrations therein. The wavefront error sensor 60 then provides control signals 71 to the deformable mirror 42 effective to focus a readout beam from a laser source 44 onto a target 18. The image processor 60 effectively provides phase correction data (signal 71) to the deformable mirror 42 so that diffraction-limited compensated imaging of the target 18 can be realized. The image processor 60 also provides for target recognition and classification and subsequently enables the readout laser beam 44 to be directed to the target with diffraction limited performance in conjunction with the dual-axis mirror driven by signal 72 from the processor 60 and the optical relay system 70, that images the readout optical beam from the dual-axis mirror 49 onto the surface of the deformable mirror 42. Coarse targeting data may be supplied by an external system if needed. A modulator 46 acting under control of an IRCM system 48 may be used to provide for modulation of the output beam as per the embodiment of FIG. 2. A dual axis mirror 49 operates under control of the wavefront sensor 60 to locate the output beam on the target. The wavefront error sensor 60 may be implemented in accordance with techniques known in the art.

Those skilled in the art will appreciate that in accordance with the present teachings, inasmuch as, no active beacon illumination is employed, adaptive optical correction and imaging are performed in a passive covert manner. Hence, the embodiment of FIG. 3 offers the additional advantage of providing a countermeasure before the system 50 is discovered by a threat, thereby further improving the efficacy and survivability of the system.

Figure 4:
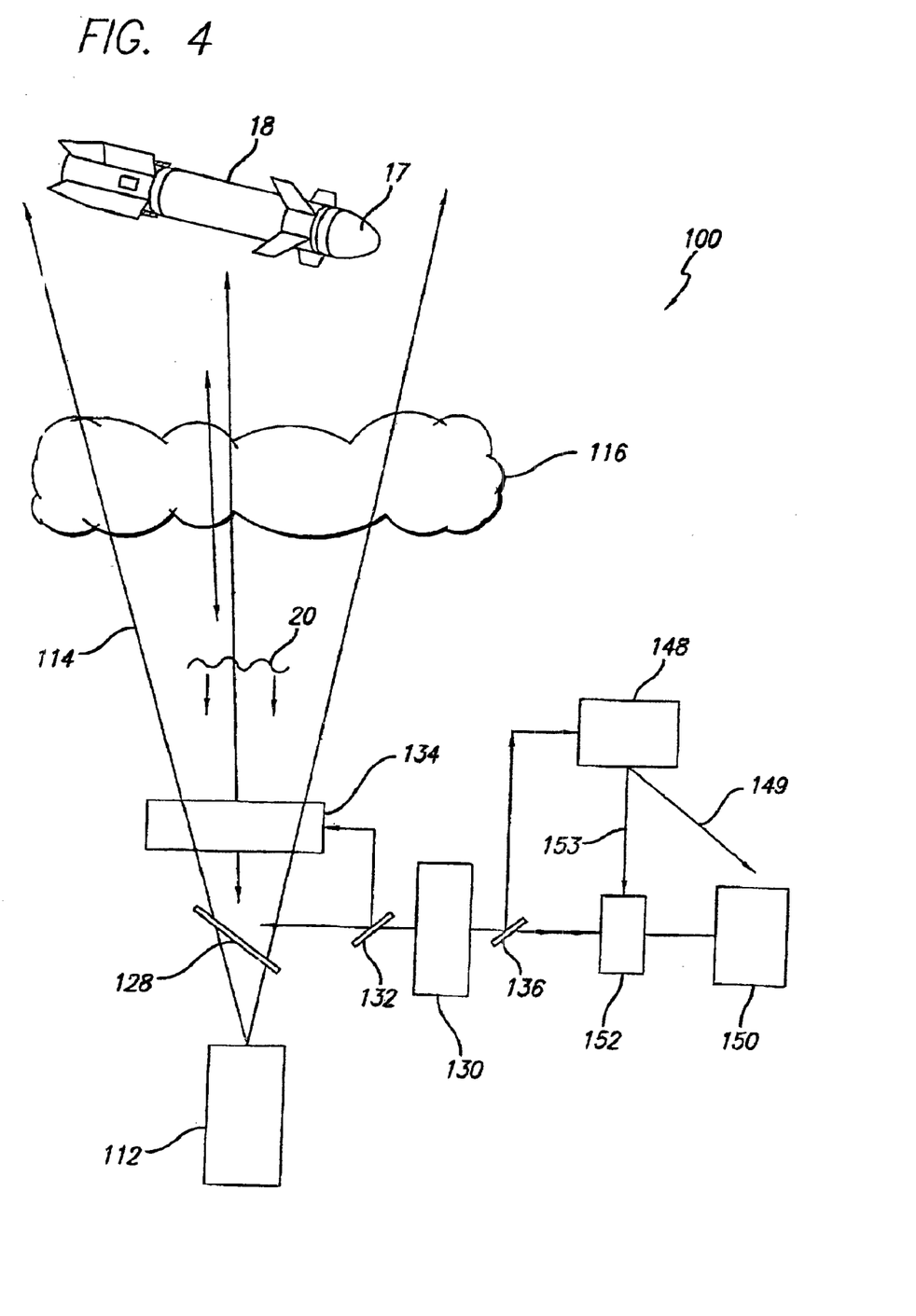
FIG. 4 is an optical schematic and electrical block diagram of a second alternative embodiment of the system for focusing electromagnetic energy of the present invention.

FIG. 4 is an optical schematic and electrical block diagram of a second alternative embodiment of the system for focusing electromagnetic energy of the present invention. In the embodiment of FIG. 4, a nonlinear optical phase conjugate mirror 150 is used in place of elements 40 and 42 in FIG. 2. Hence, a beacon laser 112 outputs a pilot beam 114 in the direction of a target 18. The pilot beam is reflected as a glint by the target 18 which spreads as a return wavefront 20 as per the case in FIG. 2. The distorted wavefront is then directed to a laser amplifier 130 by a mirror 128. A portion of the received wavefront is directed to a tracker 134 by a second mirror 132. The tracker 134 may be implemented in the same manner as the tracker 18' of FIG. 1, or 28 of FIG. 2. A second beamsplitter 136 directs a portion of the received beam to a closed-loop IRCM controller 148. As discussed above, the closed-loop IRCM controller 148 detects the incoming modulation scheme from the target, if any, and/or is fed target data from an external tracking system and/or database (not shown). The controller 148 can also provide control signals for modulating the phase-conjugate return beam via an external modulator 152.

Most of the received beam from the target passes through the beamsplitter 136 and is incident upon a phase-conjugate mirror (PCM) 150. The PCM 150 generates a wavefront-reversed replica of the incident beam, using all-optical processing in a nonlinear optical element, without the need for a wavefront error sensor processor or a deformable mirror (elements 40 and 42, respectively, of FIG. 2). The PCM 150 can either be a passive device (e.g., a nonlinear element) or a combination of a passive device (e.g., a nonlinear optical element) in conjunction with a readout laser.

One class of a nonlinear optical processor that comprises an externally pumped PCM is an optical four-wave mixer element (e.g., a semiconductor laser diode medium, a doped solid-state crystal or glass in a bulk or waveguide configuration, a nonlinear optical material with a thermal nonlinearity, an atomic vapor, etc.). Other examples of PCMs include double-pumped PCMs and self-pumped PCMs (e.g., photorefractive crystals, SBS cells using long multi-mode optical fibers or liquid-filled cells).

The required IRCM modulation signal is determined by the processor 148, and can be imposed directly to the conjugate mirror, 150 by the controller 148 or can be imposed onto the external modulator 152 through which the phase-conjugate beam traverses on its way back through the system and, ultimately, back to the target.

In the former case, modulation of the phase-conjugate beam can be imposed onto the readout laser beam (not shown, but can be incorporated into element 150) in the case of four-wave mixing, double-pumped PCMs or a modulated seed beam in the case of SBS.

In the case of certain self-pumped PCMs (which do not require separate readout lasers within element 150), such as photorefractive crystals, the modulation can be imposed globally onto the crystal via electro-optic methods, by applying the modulation signal 149, directly onto the PCM crystal itself. (See U.S. Pat. No. 4,767,195 issued Aug. 30, 1988 to D. M. Pepper and entitled SYSTEM AND METHOD FOR ENCODING INFORMATION ONTO AN OPTICAL BEAM, the teachings of which are incorporated herein by reference.)

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for focusing electromagnetic energy on a target having a nature, functionality, purpose, operational state and threat, the system comprising:

first means for directing a pilot beam of electromagnetic energy toward the target to covertly obtain information from the target;

second means for receiving a spatially and temporally dependent electromagnetic field having phase, frequency, amplitude, and polarization characteristics, wherein the electromagnetic field corresponds to a reflection of said pilot beam from the target which includes detected information from the target;

third means for analyzing the received electromagnetic field from the target to determine, from the received electromagnetic field, information that is indicative of at least one of: the nature of the target, the functionality of the target, the purpose of the target, the operational state of the target and the threat of the target and in response to the information for providing data which is indicative of at least one of: the nature of the target, the functionality of the target, the purpose of the target, the operational state of the target and the threat of the target; and fourth means for receiving the data from said third means and in response to said data for providing modulated information back to the target and wherein said fourth means is adapted to modulate the output beam by changing at least one of a phase characteristic, a frequency characteristic, an amplitude characteristic, a polarization characteristic and a carrier frequency wavelength characteristic and wherein the modulated output beam is predistorted to compensate for distortions, phase noise and amplitude noise in said received electromagnetic field.

2. The invention of claim 1 wherein said first means includes a beacon laser.

3. The invention of claim 2 wherein said beacon laser is mounted off-axis with respect to said output beam.

4. The invention of claim 1 wherein said second means includes a telescope.

5. The invention of claim 4 wherein said telescope is gimbaled.

6. The invention of claim 5 wherein said second means further includes a detector in optical alignment with said telescope.

7. The invention of claim 6 wherein said second means further includes a track processor in communication with said detector.

8. The invention of claim 1 wherein said third means includes a wavefront error sensor.

9. The invention of claim 8 wherein said fourth means includes means for providing an output beam which is a phase conjugate of said received electromagnetic field.

10. The invention of claim 9 wherein said fourth means includes a deformable mirror and wherein the information from the target is used explicitly in a closed-loop processor to encode modulated information that is subsequently sent covertly back to the target.

11. The invention of claim 10 wherein said fourth means includes mirror control means responsive to said wavefront sensor for controlling said deformable mirror.

12. The invention of claim 11 wherein said first means corresponds to a beacon laser and said fourth means includes a second laser, different from the beacon laser, for illuminating said deformable mirror to provide said output beam.

13. The invention of claim 1 wherein the modulated output beam is adapted to affect the target in a predetermined manner.

14. The invention of claim 1 wherein said fourth means includes means for detecting a modulation in a beam received from the target.

15. The invention of claim 14 wherein said fourth means further includes a closed-loop system controller responsive to said means for detecting a modulation.

16. The invention of claim 15 wherein said fourth means includes an electro-optic shutter disposed in the path of the output of said laser and responsive to said closed-loop system controller.

17. The invention of claim 16 wherein said fourth means includes means for controlling said deformable mirror to effect a modulation of said output beam.

18. The invention of claim 1 wherein n said third means and said fourth means are implemented with an optical phase conjugate mirror.

19. A system for focusing electromagnetic energy on a target comprising:

first means for analyzing information included in a received electromagnetic field corresponding to a reflection of a beacon signal from the target to determine, from the received electromagnetic field, information that is indicative of at least one of: a nature of the target, a functionality of the target, a purpose of the target, an operational state of the target and a threat of the target and for providing data in response thereto, said electromagnetic field being provided by star light and electromagnetic field distortions being due to the atmosphere and wherein the electromagnetic field includes information covertly obtained from the target; and second means for receiving the covertly obtained information from said first means and for providing a modulated output beam in response to said covertly obtained information wherein said second means is adapted to modulate the output beam by changing at least one of a phase characteristic, a frequency characteristic, an amplitude characteristic, a polarization characteristic and a carrier frequency wavelength characteristic and wherein the modulated output beam is predistorted to compensate for distortions, phase noise and amplitude noise in said received electromagnetic field.

20. The invention of claim 19 wherein said first means includes a wavefront error sensor.

21. The invention of claim 20 wherein said wavefront error sensor is adapted to detect distortions in star light and other phase and/or amplitude information in said electromagnetic field induced by the atmosphere.

22. The invention of claim 21 wherein said second means includes a deformable mirror.

23. The invention of claim 22 wherein said wavefront error sensor includes means for controlling said deformable mirror to predistort said output beam whereby said output beam is focused by said atmosphere at a target.

24. The invention of claim 23 wherein said second means includes a laser for illuminating said deformable mirror to provide said output beam.

25. The invention of claim 19 wherein the modulated output beam is adapted to affect the target in a predetermined manner.

26. The invention of claim 19 wherein said second means includes means for detecting a modulation in a beam received from the target.

27. The invention of claim 26 wherein said second means further includes a closed-loop system controller responsive to said means for detecting a modulation.

28. The invention of claim 27 wherein said second means includes an electro-optic shutter disposed in the path of the output of said laser and responsive to said closed-loop system controller.

29. The invention of claim 19 wherein said first means and said second means are implemented with an optical phase conjugate mirror.

30. A method for focusing electromagnetic energy on a target having at least one of a nature, functionality, purpose, operational state and threat, the method including:

emitting a pilot beam of electromagnetic energy toward the target to covertly obtain information from the target;

receiving an electromagnetic field corresponding to a reflection of the pilot beam from the target wherein the electromagnetic field includes covertly obtained information from the target;

analyzing distortions in the received electromagnetic field to determine, from the received electromagnetic field, information that is indicative of at least one of: the nature of the target, the functionality of the target, the purpose of the target, the operational state of the target and the threat of the target and providing data in response thereto wherein the data is indicative of at least one of: the nature of the target, the functionality of the target, the purpose of the target, the operational state of the target and the threat of the target wherein the information from the received electromagnetic field is used to encode modulated information that is subsequently transmitted back to the target; and modulating an output beam in response to the data, wherein said modulating includes modulating the output beam by changing at least one of a phase characteristic, a frequency characteristic, an amplitude characteristic, a polarization characteristic and a carrier frequency wavelength characteristic and wherein the modulated output beam is predistorted to compensate for distortions, phase noise and amplitude noise in the received electromagnetic field.

* * * * *

UNITED STATES PATENT AND TRADEMARK OFFICE
CERTIFICATE OF CORRECTION

PATENT NO. : 6,872,960 B2
DATED : March 29, 2005
INVENTOR(S) : Pepper et al.

It is certified that error appears in the above-identified patent and that said Letters Patent is hereby corrected as shown below:

Column 1,
Line 49, delete "on moving target" and replace with -- on moving targets --.
Line 59, delete "beam by so" and replace with -- beam so --.

Column 5,
Line 62, delete "dual-axis mirror driven" and replace with -- dual-axis mirror 49 driven --.

Column 6,
Line 22, delete "glint by" and replace with -- glint 17 by --.

Column 8,
Line 37, delete "wherein n said" and replace with -- wherein said --.

Signed and Sealed this

Eighth Day of November, 2005

JON W. DUDAS
*Director of the United States Patent and Trademark Office*